(12) United States Patent
Lachance et al.

(10) Patent No.: US 6,842,567 B2
(45) Date of Patent: Jan. 11, 2005

(54) POWER EFFICIENT ASSEMBLIES FOR APPLYING A TEMPERATURE GRADIENT TO A REFRACTIVE INDEX GRATING

(75) Inventors: Richard L. Lachance, Sainte-Foy (CA); Philippe Pépin, Beauport (CA); Tristan Rüthers, Lachine (CA); François Pelletier, St-Augustin-de-Desmaures (CA)

(73) Assignee: Teraxion Inc., Sainte-Foy (CA)

( * ) Notice: Subject to any disclaimer, the term of this patent is extended or adjusted under 35 U.S.C. 154(b) by 170 days.

(21) Appl. No.: 10/360,548

(22) Filed: Feb. 6, 2003

(65) Prior Publication Data

US 2003/0198434 A1 Oct. 23, 2003

(30) Foreign Application Priority Data

Feb. 7, 2002 (CA) .............................................. 2371106
Apr. 26, 2002 (CA) .............................................. 2383807

(51) Int. Cl.$^7$ ................................................. G02B 6/34
(52) U.S. Cl. ........................................ 385/37; 385/31
(58) Field of Search ..................................... 385/31, 37

(56) References Cited

U.S. PATENT DOCUMENTS

| | | | |
|---|---|---|---|
| 5,671,307 A | | 9/1997 | Lauzon et al. ................. 385/37 |
| 5,706,302 A | * | 1/1998 | Shimizu ....................... 372/36 |
| 6,090,105 A | * | 7/2000 | Zepeda et al. ................. 606/41 |
| 6,118,914 A | * | 9/2000 | Davis et al. ................... 385/37 |
| 6,351,585 B1 | | 2/2002 | Amundson et al. ........... 385/37 |
| 6,404,042 B1 | * | 6/2002 | Sone et al. .................. 257/678 |
| 6,522,809 B1 | * | 2/2003 | Takabayashi et al. ......... 385/37 |
| 2002/0093738 A1 | * | 7/2002 | Kimura et al. ............... 359/497 |
| 2003/0228103 A1 | * | 12/2003 | Ohira et al. ................... 385/37 |
| 2004/0071400 A1 | * | 4/2004 | Haroud et al. ................. 385/37 |

FOREIGN PATENT DOCUMENTS

| | | | |
|---|---|---|---|
| EP | 0867736 | 9/1998 | ............ G02B/6/16 |
| EP | 0997764 | 5/2000 | ............. G02F/1/01 |

OTHER PUBLICATIONS

Jocelyn Lauzon et al., Implementation and characterization of fiber Bragg gratings linearly chirped by a temperature gradient; 2412 Optics Letters, (1994) Dec. 1, No. 23, pp. 2027–2029.

Benjamin J. Eggleton et al., Tunable fiber grating devices utilizing integrated thin film heaters; XP–008003228, OSA TOPS vol. 29 WDM Components, 1999, pp. 61–72.

\* cited by examiner

*Primary Examiner*—Ellen E. Kim
(74) *Attorney, Agent, or Firm*—Darby & Darby

(57) ABSTRACT

The present invention discloses practical and power efficient assemblies for applying a temperature gradient to a fiber Bragg grating. An application of such assemblies is, for example, the active tuning of the chromatic dispersion of the grating. The temperature gradient is produced in a heat conductive element, with which the FBG is in continuous thermal contact, by elements controlling the temperature of the ends of the heat conductive element, thereby applying the temperature gradient to the FBG. A first preferred embodiment includes a heat recirculation member allowing the recirculation of heat between the two ends of the heat conductive elongated element, thereby providing a rapid and dynamical tuning of the temperature gradient with a minimal heat loss. A second embodiment provides isolation from the surrounding environment in order to decouple the desired temperature gradient from ambient temperature fluctuations, thereby improving the control of the optical response of a fiber grating.

36 Claims, 6 Drawing Sheets

POWER EFFICIENT ASSEMBLIES FOR APPLYING A TEMPERATURE GRADIENT TO A REFRACTIVE INDEX GRATING

FIELD OF THE INVENTION

The present invention generally relates to optical fiber Bragg gratings, and more particularly concerns the dynamical tuning of the optical properties of a grating by means of a controlled temperature gradient. An exemplary application of this invention is the active tuning of the chromatic dispersion of the grating.

BACKGROUND OF THE INVENTION

A temperature gradient can be induced in an optical fiber containing a fiber Bragg grating (FBG) in order to change the characteristic spectral response of the grating. Such thermally adjustable devices show great potential for optical communication systems. It is known in the art how to impose a temperature change or gradient to a FBG for various purposes. Uniform heating along the length of the grating allows to shift the spectral response of the device, while a variable heating along said length allows to adjust the bandwidth and/or dispersion of the grating.

More particularly, U.S. Pat. No. 5,671,307 (LAUZON et al.) discloses the use of a temperature gradient to impose a chirp on a FBG. The temperature gradient is realised with a heat conductive substrate, such as a thin brass plate holding the portion of fiber containing the Bragg grating, and Peltier effect plates heating one end of the fiber and cooling the other. Lauzon suggests that the device might be used as a tuneable dispersion compensator for optical fiber communication links, but does not disclose any energy efficient embodiment of such a device.

European patent No. 0 867 736 (FARRIES et al.) also discloses a temperature-based device and method for wavelength and bandwidth tuning of an optical grating. This patent combines the application of a temperature gradient and a mechanical strain to modify the optical properties of the grating. This device requires gluing the fiber to a metal block along its entire length, which in practice is a technologically challenging operation.

U.S. Pat. No. 6,351,385 (AMUNDSON et al.) presents a method for enhancing the performance of thermally adjustable fiber grating devices by disposing them within a vessel that eliminates detrimental air currents around the fiber. This invention requires the application of a special resistive coating to the fiber itself for heating purposes. The coating thickness must be varied in a well controlled manner along the fiber in order to produce a desired temperature gradient.

As requirements of optical communication systems get more and more demanding, near ideal grating performance becomes critical in many applications. A practical method for efficiently applying an accurately controlled temperature gradient to a FBG that may be used in many applications is therefore needed.

SUMMARY OF THE INVENTION

Accordingly, it is an object of the present invention to provide a practical and power efficient assembly for inducing a temperature gradient in a FBG.

It is a preferable object of the present invention to provide such a power efficient assembly which minimizes heat losses in the application of the temperature gradient to a Bragg grating.

It is another preferable object of the invention to allow the rapid and energy-efficient tuning of the spectral response of an optical fiber Bragg grating.

It is another preferable object of the present invention to minimise energy losses through radiation in an assembly inducing a temperature gradient in a FBG.

According to a first aspect of the present invention, there is provided a power efficient assembly for applying a temperature gradient to a refractive index grating provided in a section of optical fiber. The assembly includes a heat conductive elongated element having opposite first and second ends and a longitudinal axis extending therebetween. The elongated element is provided with a fiber-receiving area along its longitudinal axis shaped for receiving the section of optical fiber therealong in continuous thermal contact with the elongated element. The assembly also includes a first heat pumping device for maintaining the first end of the elongated element at a first temperature and a second heat pumping device for maintaining the second end of the elongated element at a second temperature different from the first temperature, thereby applying the temperature gradient to the refractive index grating. Each of the first and second heat pumping devices has a top side in thermal contact with a corresponding end of the elongated element and a bottom side opposed thereto. In operation, the first heat pumping device pumps heat from the top to the bottom side thereof and the second heat pumping device pumps heat from the bottom to the top side thereof. Moreover, the assembly is also provided with a heat recirculation member having opposite first and second ends respectively in thermal contact with the bottom sides of the first and second heat pumping devices. In operation, the heat recirculation member recuperates heat from the bottom side of the first heat pumping device and recirculates the heat to the bottom side of the second heat pumping device.

Preferably, the heat conductive elongated element is a tube made out of a metallic conductor and provided with a cavity extending therethrough along the longitudinal axis for freely receiving the section of optical fiber, thereby thermally insulating the latter. The heat conductive elongated element thus assumes two functions, i.e. heating the optical fiber and isolating it from air currents or thermal perturbations.

According to another aspect of the present invention, there is also provided another power efficient assembly for applying a temperature gradient to a refractive index grating provided in a section of optical fiber. The assembly includes a heat conductive elongated element having opposite first and second ends and a longitudinal axis extending therebetween. The elongated element is provided with a cavity extending therethrough along its longitudinal axis for freely receiving the section of optical fiber therein in continuous thermal contact with the elongated element. The assembly also includes a heat exchanging system for maintaining the first end of the elongated element at a first temperature and the second end of the elongated element at a second temperature different from the first temperature, thereby applying said temperature gradient to the refractive index grating. The heat exchanging system comprises a first and a second heat pumping device respectively operationally connected to the first and second ends of the elongated element. In operation, the first heat pumping device pumps heat out of the first end of the elongated element and the second heat pumping device pumps heat in the second end of the elongated element. Moreover, the assembly is also provided with a thermal insulating enclosure provided around at least a portion of the elongated element between the first and second ends thereof. The insulating enclosure includes a vacuum chamber surrounding the portion of the elongated element. Thus, the thermal gradient inside the elongated element is then controlled solely by the temperature set values at the extremities thereof, without being affected by the ambient temperature. This improves the linearity of the thermal gradient along the elongated element.

Advantageously, the present invention allows for the manufacture of practical devices for a plurality of applications. In accordance with the preferred embodiments, the invention may be applied to make a tunable dispersion compensator, or tunable optical filters in general. Any device requiring a highly linear temperature gradient to be applied along a fiber Bragg grating or along any other type of filiform optical component will also benefit from the teachings of the present invention.

Other aspects and advantages of the present invention will be better understood upon reading preferred embodiments thereof with reference to the appended drawings.

BRIEF DESCRIPTION OF THE DRAWINGS

These and other objects and advantages of the invention will become apparent upon reading the detailed description and upon referring to the drawings in which.

Figure 1:
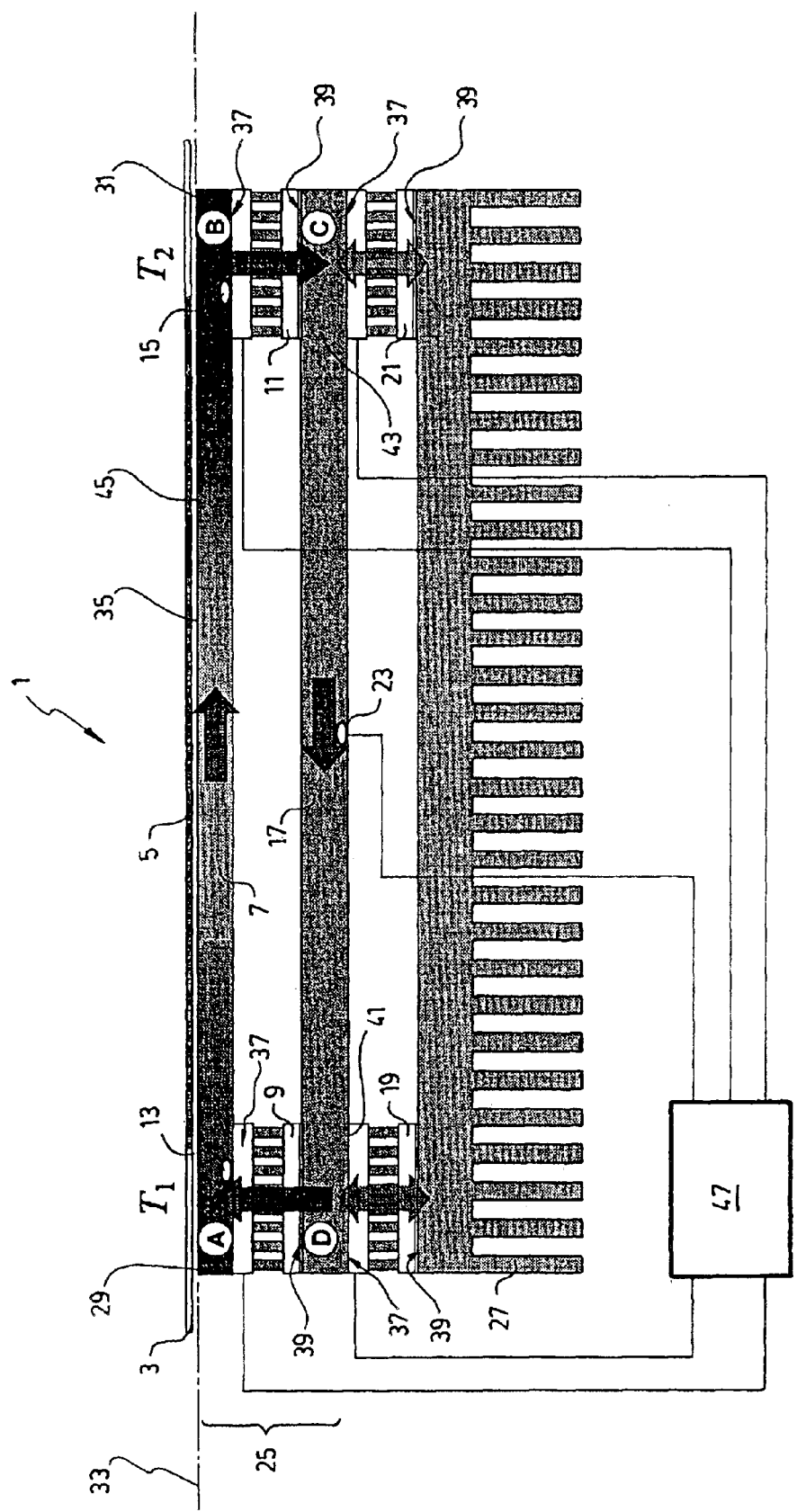
FIG. 1 is a schematic side view of a power efficient assembly according to a preferred embodiment of the present invention.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

DESCRIPTION OF A PREFERRED EMBODIMENT

In the following description, similar features in the drawings have been given similar reference numerals and in order to weigh down the figures, some elements are not referred to in some figures they were already identified in a preceding figure.

The present invention concerns a practical and power efficient assembly for applying a temperature gradient to a refractive index grating. Such a device allows for the dynamical tuning of the optical properties of a grating such as, for example, the chromatic dispersion of the grating.

Figure 4:
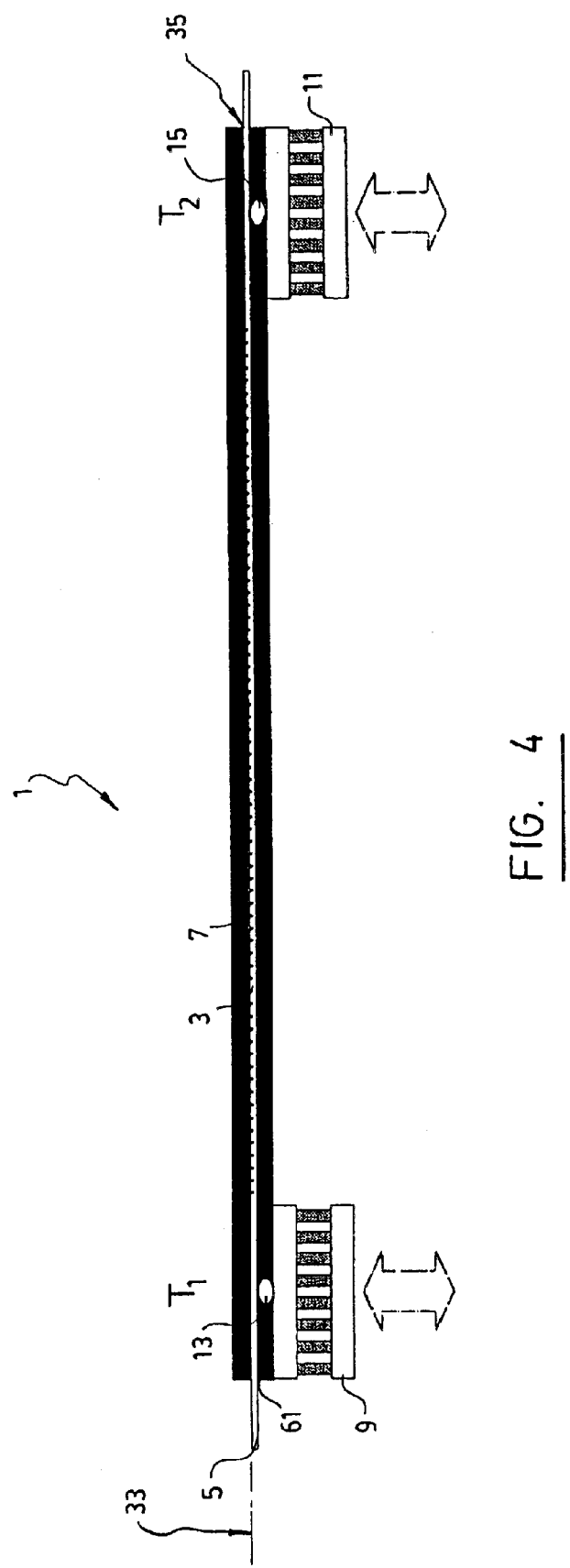
FIG. 4 is a schematic partial side view of another power efficient assembly according to another preferred embodiment of the present invention.

Referring to FIG. 1, there is shown a power efficient assembly 1 for applying a temperature gradient to a refractive index grating 5 provided in a section of optical fiber 3. The assembly 1 includes a heat conductive elongated element 7 having opposite first and second ends 29, 31 and a longitudinal axis 33 extending therebetween. The elongated element 7 has a fiber-receiving area 35 along the longitudinal axis 33 shaped for receiving the section of optical fiber 3 therealong in continuous thermal contact with the elongated element 7. Preferably, the elongated element 7 is made out of a metallic conductor for allowing an uniform transfer of heat therealong and, thus, creating a temperature gradient along the adjacent fiber 3. In the illustrated embodiment, the fiber-receiving area 35 includes a groove 45 provided along the heat conductive elongated element 7 and a thermal compound extending therein for providing the continuous thermal contact between the section of optical fiber 3 and the heat conductive elongated element 7. Preferably, the portion of the fiber 3 containing the Bragg Grating 5 is located at the center of the length of the elongated element 7. In another preferred embodiment which is illustrated in FIG. 4, the heat conductive elongated element 7 is a tube provided with a cavity along the longitudinal axis 33 defining the fiber receiving area 35 and freely receiving the section of optical fiber 3. This preferred embodiment isolates the fiber 3 from surrounding perturbations. Moreover, a thermal compound is not required to ensure a good replication of the temperature profile along the elongated element 7 in the fiber 3. Furthermore, the optical properties of the Bragg grating remain unaffected by the contact between the optical fiber 3 and the elongated element 7. Finally, long term reliability is increased since no mechanical stress is applied to the optical fiber 3 at any time. Within this preferred embodiment, the fiber 3 remains unaffected by the thermal expansion (or contraction) of the elongated element 7, since they are not mechanically coupled to one another. Only the thermal change in the refractive index of the fiber 3 will affect the optical properties of the Bragg grating 5. For further improve the performance of the device, a low emissivity construction of the tube may advantageously be used, such as, for example, a tube having an exterior surface provided with a mirror finish. Advantageously, the optical fiber 3 shall be recoated with an acrylic jacket in order to prevent any contact between the sensing material of the fiber 3, which generally consists of glass, and the metallic material of the elongated element 7. Such a recoating thus prevents deterioration of the fiber by microcracks that could lead to a breakage of the fiber 3, and consequently improves the reliability of the system. One can use standard recoating methods which are well known in the art and which won't be further exposed therein.

Referring back to FIG. 1, the assembly 1 is also provided with a first heat pumping device 9 for maintaining the first end 29 of the elongated element 7 at a first temperature, and a second heat pumping device 11 for maintaining the second end 31 of the elongated element 7 at a second temperature different from the first temperature, thereby applying the temperature gradient to the refractive index grating 5. Each of the first and second heat pumping devices 9, 11 has a top side 37 in thermal contact with a corresponding end 29, 31 of the elongated element 7 and a bottom side 39 opposed thereto. The heat pumping devices 9, 11 are mounted in thermal contact with the elongated element 7 with a pressure mounting means. Such a mounting means may be a thermal gluing, a soldering or even a pressure method mounting with a thermal compound. Preferably, the heat pumping devices 9, 11 are Peltier Effect Thermo-Electric coolers, referred hereafter as TECs. The heat pumping elements 9, 11 pump heat from one side of their body to the other to fix and maintain the temperature of the ends 29, 31 of the elongated element 7, into which will settle a natural temperature gradient $\Delta T = T_1 - T_2$. Thus, In operation, the first heat pumping device 9 pumps heat from the top to the bottom side thereof and the second heat pumping device 11 pumps heat from the bottom to the top side thereof. It is of course immaterial to the invention from which side heat is pumped out of or into.

The assembly 1 also includes a heat recirculation member 17 having opposite first and second ends 41, 43 respectively in thermal contact with the bottom sides 39 of the heat pumping devices 9, 11. In operation, the heat recirculation member 17 recuperates heat from the bottom side 39 of the first heat pumping device 9 and recirculates the heat to the bottom side 39 of the second heat pumping device 11. In other words, the heat recirculation member 17 acts as a "heat exchanger" into which a TEC 9, 11 can dump or extract heat.

For allowing an appropriate control of the temperature gradient applied to the FBG 5, each of the heat pumping devices 9, 11 is advantageously operationally connected to a temperature sensor 13, 15 mounted in close proximity to the corresponding end 29, 31 of the heat conductive elongated element 7. The temperature sensors 13, 15 may be thermistors or resistance temperature detectors (RTD), for example. These sensors 13, 15 are fixed in close contact with an appropriate method, using for example a thermally conductive epoxy.

The assembly 1 may also advantageously include a servo-control system 47 connected to each of the heat pumping devices 9, 11 for precisely controlling the first and second temperatures. Moreover, signals from the sensors 13, 15 are advantageously used as input to the servo-control system 47 to precisely control (fix and maintain) the temperature at each end of the grating 5. Such servo-control systems 47 for temperature control are well known in the art, comprising appropriate control electronics and drive such as TEC controllers with PID servo-control for optimum dynamic operation.

Moreover, The power efficient assembly 1 may be provided with at least one additional heat pumping device having a top side 37 arranged in thermal contact with the heat recirculation member 17. Such an assembly 1 may further include a heat exchanging means 27, preferably a heat sink, arranged in thermal contact with the bottom side of each of the at least one additional heat pumping device for exchanging heat between the heat recirculation member 17 and surroundings thereof. In the case where a single additional heat pumping device is used, it could advantageously be mounted in the middle of the heat recirculation member 17. In the case illustrated in FIG. 1, the power efficient assembly 1 is provided with a third and a fourth additional heat pumping devices 19, 21. Each of them has a top side 37 respectively arranged in thermal contact with the first and second ends 41, 43 of the heat recirculation member 17. The illustrated assembly 1 further includes a heat sink 27 arranged in thermal contact with the bottom side 39 of each of the additional heat pumping devices 19, 21.

In order to change the optical properties of fiber grating 5, an appropriate thermal gradient $\Delta T$ is induced in the elongated element 7 by setting temperatures $T_1$ and $T_2$ at its first and second ends 29, 31 with heat pumping elements 9, 11. The following scenario is intended as a non-restrictive example illustrating the principle of operation of the invention. Let's assume for the purpose of demonstration that the first end 29 of the elongated element 7 at temperature $T_1$ (point A in FIG. 1) is hotter than the second end 31 at temperature $T_2$ (point B), i.e. $T_1 > T_2$. The difference in temperature creates a temperature gradient inside the elongated element 7 and a heat flux ensues, flowing from hot point A to cold point B. Ensuring that the heat loss along the elongated element 7 is small compared to the heat flux in the elongated element 7 keeps the temperature gradient along the elongated element 7 nearly linear. In order to maintain the temperature gradient, heat must be supplied to the elongated element 7 at point A and extracted from the elongated element 7 at point B. In this case, the TEC 9 extracts heat from the heat recirculation member 17 at point D and pumps it into the elongated element 7 at point A. At the other end, the TEC 11 extracts heat from the elongated element 7 at point B and drops it into the heat recirculation member 17 at point C. The heat taken out of the elongated element 7 is thus sunk into the recirculation member 17 rather than dissipated in air with a regular heat sink. A second temperature gradient, opposed to the one existing in the elongated element 7, is therefore created in the heat recirculation member 17. As indicated by arrows in FIG. 1, heat flows from point A to B in the elongated element 7, and from point C to the D in the recirculation element 17. This continuous heat flow is sustained by TEC 9 maintaining a temperature difference between points A and D and by TEC 11 maintaining a temperature difference between points B and C. Recycling the heat extracted from the elongated element 7 rather than dissipating it into the surroundings makes the system more power efficient.

A main advantage of the present invention follows from this idea of a recirculation loop, identified in FIG. 1 as the heat recirculation region 25, which allows the continuous exchange of heat between the elongated element 7 and the recirculation element 17. When the system is properly isolated, the power required to maintain the temperature gradient is minimal and serves only to counteract natural heat losses. This avoids the unnecessary loss of power in a large heat sink that wastes energy and affects efficiency. This principle of operation applies of course for any other combination of temperatures $T_1$ and $T_2$, and is not limited to the case $T_1 > T_2$ given in the example.

The at least one additional heat pumping device, which is fixed to the recirculation element 17 can be used to dissipate excess heat from the recirculation member 17 into the heat exchanging means 27, if needed, in order to maintain the average temperature of the system. This situation is most likely to occur during rapid transitions, when the temperature gradient is quickly inverted by changing the heat flow direction within TECs 9, 11. The heat recirculation element 17 can also overheat or get too cold in the advent of external or environmental temperature changes. The additional TEC then pumps heat out of the system, or into the system, to bring TECs 9, 11 within their optimal temperature range of operation. As a first example, one can apply first and second temperatures to the corresponding ends of the elongated element 7 which are lower than the surrounding. In that case, the additional TEC will evacuate the heat excess of the heat recirculation member 17. In a second example where the first and second temperatures are higher than the temperature of the surrounding, the additional TEC will help keeping the heat recirculation member 17 to its average temperature, which depends on the first and second temperatures. Such an embodiment will thus provide a more rapid tuning of the spectral response of the grating 5. The heat exchanging means 27 can consist in a standard dissipative heat sink with fins or more simply in a large heat dissipation plate. It can even be the metallic casing of a packaged device. Advantageously, the temperature of the heat recirculation member 17 may be monitored with a temperature sensor 23 operatively connected to the servo-control system 47 described above.

In a properly implemented embodiment of the present invention operated under normal conditions, the role of the additional TEC is minimal, as the temperature gradient is self-maintained by the heat exchange via the recirculation region 25 between the elongated element 7 and the recirculation bar 17. Proper implementation requires minimizing heat losses, achieved by using low emissivity materials, by thermally isolating the device and by ensuring a good thermal contact between the heat pumping elements 9, 11 and the elongated element 7 and the recirculation element 17.

In many applications, the thermal gradient applied to the grating should ideally be linear. In principle, a linear temperature gradient can be created between the ends of an elongated element if the ends are maintained at different temperatures and if heat transport takes place only between these ends. In practice, heat loss from the elongated element to the surroundings distorts the thermal gradient which no longer remains linear.

Heat loss from the elongated element to the surroundings can result from three different mechanisms, i.e. conduction, convection, and radiation. Conductive heat transport consists in the microscopic transfer of kinetic energy, through direct contact, between neighbouring atoms or molecules. Air, being a tenuous medium, is a good thermal insulator that gives rise to little conduction. Convective heat transport results from the macroscopic motion of a fluid between a warmer location and a cooler one. For example, an air current can pick up some heat from the conductive elongated element and take it away. A warm body can also lose heat through radiation, i.e. by emitting electromagnetic waves. Radiative heat transport does not require a material support, since electromagnetic waves can travel in vacuum.

Figure 2:
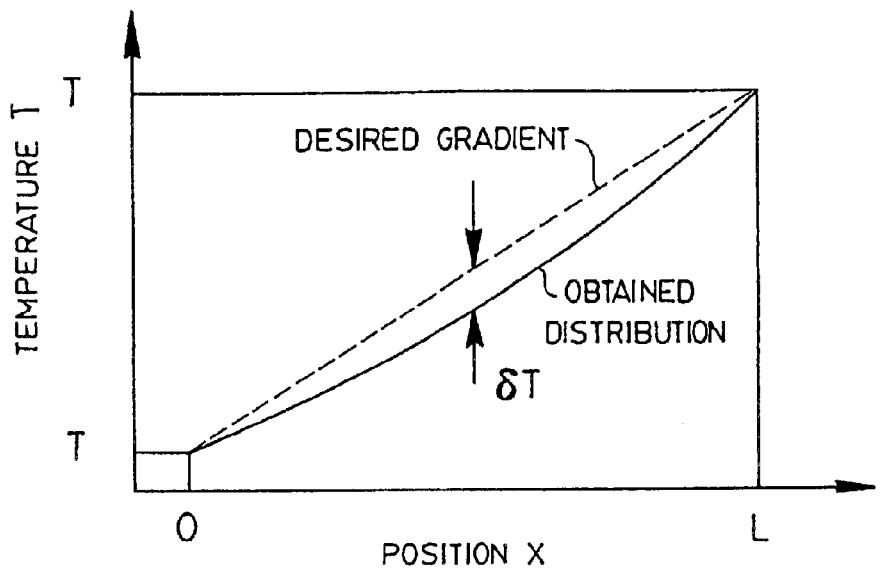
FIG. 2 is a graph illustrating the discrepancy from an ideal linear temperature gradient caused by heat loss to the surroundings in a non-isolated system.

In order to improve the linearity of the thermal gradient along the conductive elongated element, these heat loss mechanisms between the elongated element and the surroundings should be minimised. In the case at hand, the low emissivity of the metallic elongated element reduces radiative losses. As a result, the heat loss from the conductive elongated element mainly stems from convection. Neglecting radiation heat loss, the temperature distribution along the elongated element is then given by Equation 1:

$$T(x) = T_\infty + \left[(T_1 - T_\infty)\frac{(\theta_2/\theta_1)\sinh(mx) + \sinh(m(L-x))}{\sinh(mL)}\right] \quad (1)$$

where $\theta_1 = T_1 - T_\infty$, $\theta_2 = T_2 - T_\infty$, $m = \sqrt{hP/kA}$, $0 \leq x \leq L$ is the position along the elongated element 7, L being the length of the elongated element, A and P are respectively the area and perimeter of the elongated element cross-section, $T_1$ and $T_2$ are the temperature of the ends of the elongated element at x=0 and x=L, respectively, $T_\infty$ is the ambient temperature away from the elongated element 7, k is the thermal conductivity of the material constituting the elongated element 7 and h is the convection heat transfer coefficient. FIG. 2 illustrates the effect of convective heat loss on the temperature gradient along the elongated element when both ends of the elongated element are warmer than the surroundings ($T_2 > T_1 > T_\infty$). The heat loss is seen to distort the thermal gradient, the temperature distortion being indicated as δT in the figure.

Figure 3:
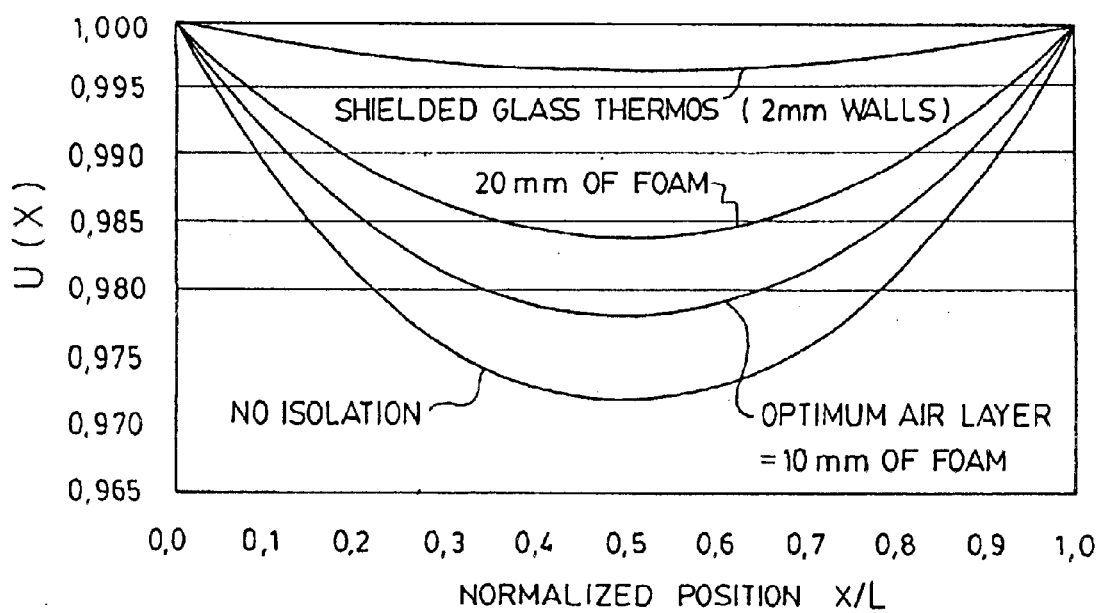
FIG. 3 is a graph showing the normalised temperature gradient for different insulation schemes.

According to Equation 1, the linearity of the gradient depends on the ratio between the convective heat loss (~hP) and the heat flux in the elongated element (~kA) through factor m. Equation 1 actually reduces to:

$$T(x)|_{m\to 0} = \frac{(L-x)T_1 + xT_2}{L} \quad (2)$$

when m is small, which is the expression for the ideal linear gradient. The linearity can therefore be improved by reducing the heat loss to the surroundings and/or increasing the heat flux in the conductive element 7. In order to achieve low power consumption, reducing the heat loss is the preferred course of action. FIG. 3 illustrates the effect of thermally insulating the conductive element 7 on the normalised temperature distribution U(x) along the elongated element 7, defined as:

$$U(x) = \frac{T(x)}{\left(\frac{T_2 - T_1}{L}\right)x + T_1} \quad (3)$$

where T(x) is given by Equation 2. (The normalised temperature distribution for the ideal linear gradient is therefore equal to U(x)=1.) These distributions were computed using a finite elements analysis software and confirmed by numerical analysis. They clearly show that strengthening the thermal insulation around the conductive element 7 improves the linearity of the thermal gradient along the element 7.

The insulation schemes considered in FIG. 3 will be discussed in more details below, after a presentation of another preferred embodiment of the present invention using a vacuum insulation.

Figure 5:
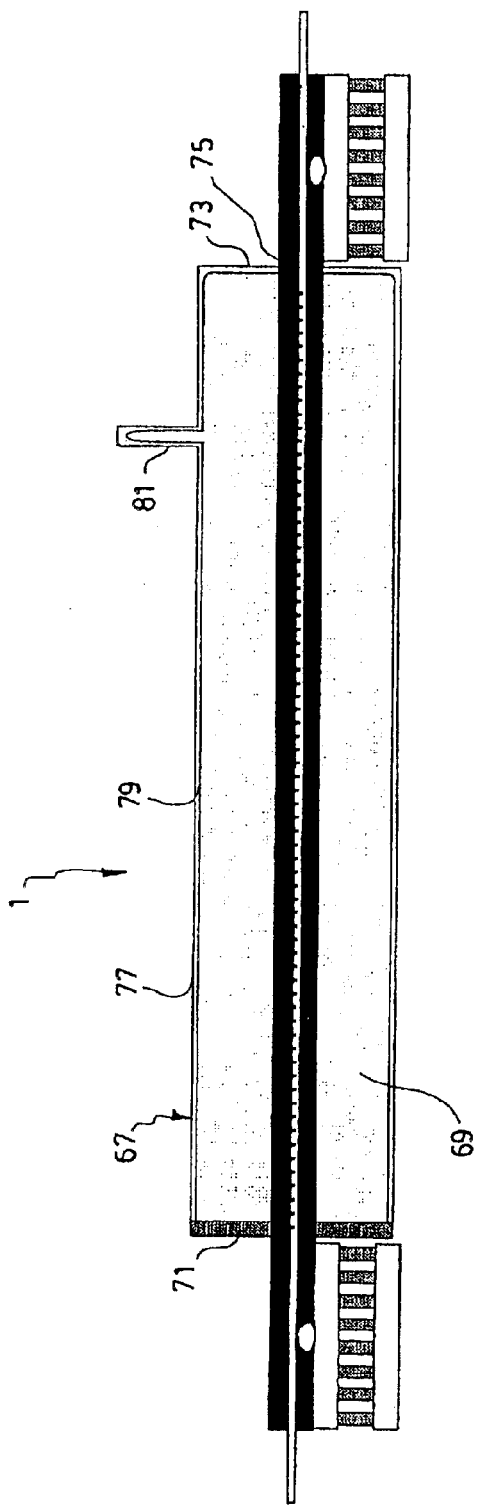
FIG. 5 is a schematic side view of another power efficient assembly in which thermal insulation is provided by a vacuum region contained in a thermos-like device according to another preferred embodiment of the present invention.
Figure 6:
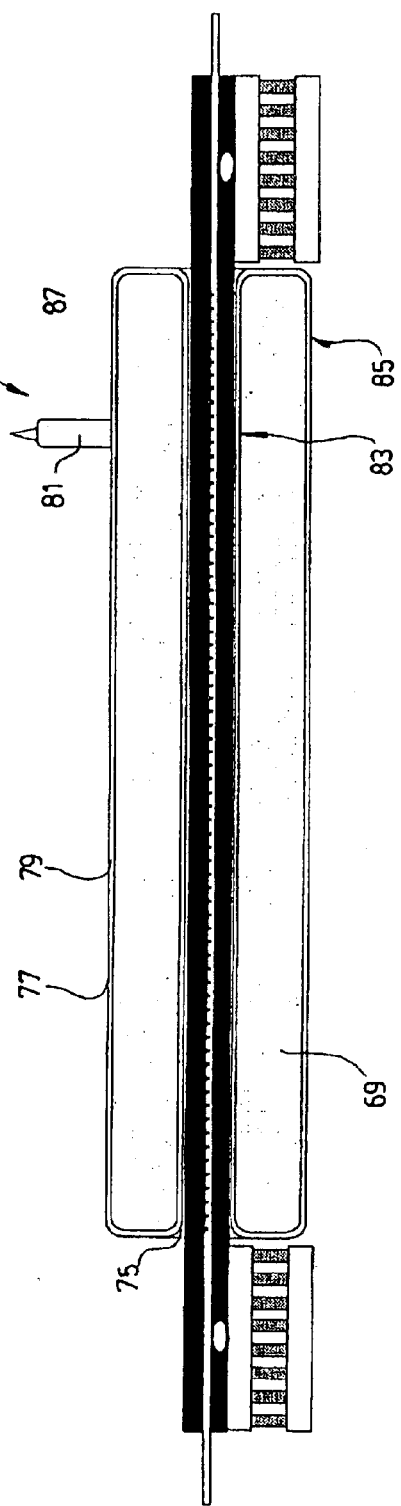
FIG. 6 is a schematic side view of another power efficient assembly in which thermal insulation is provided by a vacuum region contained in a thermos-like device according to another preferred embodiment of the present invention.
Figure 7:
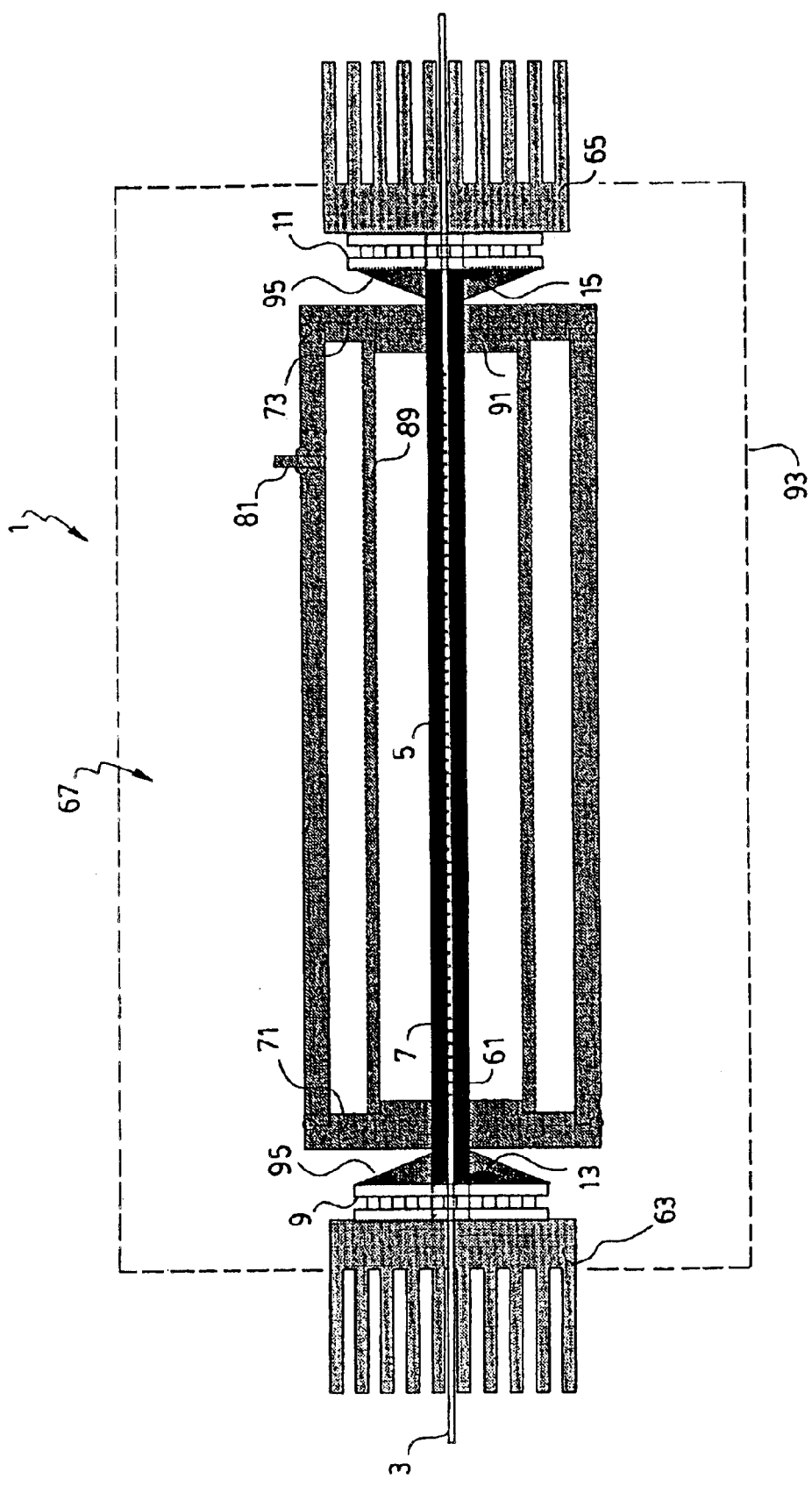
FIG. 7 is a schematic side view of a radially symmetric implementation of another power efficient assembly according to another preferred embodiment of the present invention.

According with another aspect of the present invention, there is also provided another preferred embodiment of another power efficient assembly providing isolation from the surrounding environment. In order to improve the control of the optical response of the grating, this assembly allows to decouple the desired temperature gradient from ambient temperature fluctuations. Referring now to FIGS. 5 to 7, there is shown different embodiments of a power efficient assembly 1 for applying a temperature gradient to a refractive index grating 5 provided in a section of optical fiber 3. The assembly 1 includes a heat conductive elongated element 7 having opposite first and second ends 29, 31 and a longitudinal axis 33 extending therebetween. Preferably, the elongated element 7 is made out of a metallic conductor for allowing an uniform transfer of heat therealong and thus creating a temperature gradient along the adjacent fiber 3. The elongated element 7 is provided with a cavity 61 extending therethrough along the longitudinal axis 33 for freely receiving the section of optical fiber 3 therein in continuous thermal contact with the elongated element 7. As described above, the cavity 61 isolates the optical fiber 3 from surrounding perturbations. The heat conductive elongated element 7 thus assumes two functions, i.e. heating the optical fiber and isolating it from air currents or thermal perturbations. This differs from the invention disclosed in U.S. Pat. No. 6,351,385, where these functions are carried out by separate components, i.e. the resistive coating and the isolating vessel. As also already explained above, for further improve the performance of the device, a low emissivity construction of the elongated element 7 may advantageously be used, such as, for example, a tube having an exterior surface provided with a mirror finish.

Still referring to FIGS. 5 to 7, the assembly 1 is also provided with a heat exchanging system which includes a first and a second heat pumping device 9, 11 respectively operationally connected to the first and second ends 29, 31 of the elongated element 7. The heat exchanging system allows to maintain the first end 29 of the elongated element 7 at a first temperature and the second end 31 of the elongated element 7 at a second temperature different from the first temperature, thereby applying the temperature gradient to the refractive index grating 5. In operation, the first heat pumping device 9 pumps heat out of the first end 29 of the elongated element 7 and the second heat pumping device 11 pumps heat in the second end 31 of the elongated element 7.

The power efficient assembly 1 also includes a thermal insulating enclosure 67 provided around at least a portion of the elongated element 7 between the first and second ends 29, 31 thereof. The insulating enclosure 67 includes a vacuum chamber 69 surrounding said portion of the elongated element 7. Preferably, the thermal insulating enclosure 67 is made of glass.

As stated above, heat loss from the conductive elongated element 7 to the surroundings must be minimised in order to preserve the linearity of the thermal gradient created therein. The conductive elongated element 7 can be thermally insulated by enclosing it in a cylinder made of a low density material. For example, insulating foams with a very low thermal conductivity ($k \approx 0.03$ $W/m^2K$) can be used efficiently to improve the linearity of the thermal gradient. The necessary thickness of insulating material can be determined from existing art. For example, it is found that a cylinder of foam that is too thin actually worsens the heat loss because of the increase in exposed surface with respect to the gain in insulation. Over a certain thickness, however, insulating foam does reduce the heat loss from the conductive elongated element 7. The achievable gain in performance can then be weighted against the increase in volume of the device to determine an optimum foam thickness.

At ambient temperature, air is an even better insulator than foam. In view of volume limitations, it maybe preferable in some cases to replace the foam cylinder by a thin layer of air confined in a tube. Convection within the air layer must be avoided at all cost, because it will severely degrade the thermal insulation. To this end, the air gap must be kept thin enough that buoyancy forces cannot overcome the resistance imposed by the viscous forces of air. The maximum allowable air thickness can be determined from existing art. This type of thermal insulation, discussed in U.S. Pat. No. 6,351,585, represents a good compromise between cost and complexity.

Even better insulation can be achieved by surrounding the conductive elongated element 7 with vacuum, using a thermal insulating enclosure 67, for example a vacuum dewar. Neither conduction nor convection can occur in a complete vacuum. As a result, heat loss can only result from radiation. In practice, small losses can be caused by conduction in end walls 71, 73 of the insulating enclosure 67. The amount of radiation emitted by the conductive elongated element 7 can be reduced by polishing its outer surface to a mirror finish. Another advantage of this preferred embodiment is that a vacuum region can be significantly thinner than an air gap or a foam cylinder while still maintaining its insulation properties.

FIG. 5 illustrates an embodiment of this approach where the conductive elongated element 7 is surrounded by a vacuum chamber 69. In this embodiment, the thermal insulating enclosure 67 includes two end walls 71, 73, each being provided with a hole 75 therein for receiving the heat conductive elongated element 7 therethrough. The thermal insulating enclosure 67 also includes a tubular portion 77 thermally sealed to the end walls 71, 73 and extending therebetween. The end walls 71, 73 are thermally sealed to the heat conductive elongated element 7. Thereby, the end walls 71, 73, the tubular portion 77 and the heat conductive elongated element 7 form together a closed area defining the vacuum chamber 69. An appropriate seal between the end walls 71, 73 and the conductive elongated element 7 is required in order to provide an airtight fit. The end walls 71, 73 and the tubular portion 77 can be made of different materials or from a common material. To further minimise radiative heat losses, the tubular portion 77 and/or the ends walls 71, 73 may advantageously be provided with a heat reflective coating 79 extending outwards or inwards the vacuum chamber 69. Preferably, the coating 79 is a metallic coating with a high emissivity such as, for example, gold or aluminium. The thermal insulating enclosure 67 is further provided with an airtight valve for creating and maintaining vacuum in the vacuum chamber 69.

Another implementation of the vacuum insulation is shown in FIG. 6, wherein the thermal insulating enclosure 67 includes an inner and an outer tubular walls 83, 85 sealed together at extremities thereof for defining the vacuum chamber 69 therebetween. The inner wall 83 forms a longitudinal channel 87 inwardly thereof extending centrally through the enclosure 67 for receiving the heat conductive elongated element 7. When the insulating enclosure 67 is made out of glass, the inner tubular wall 83 that gets heated by the conductive element 7 will radiate strongly, given the large emissivity of glass. A metallic heat reflective coating 79 extending on the outer wall 85 can be used to limit radiative heat loss. Such a reflective coating 79 may be applied on the interior or on the exterior of the outer wall 85. As in the previous described embodiment, vacuum is made in the vacuum chamber 69 by means of an appropriate airtight valve 81, which can be an airtight fusioned valve for example.

FIG. 7 presents another preferred embodiment of a power efficient assembly 1 that has a radial symmetry. In this embodiment, the thermal insulating enclosure 67 includes two opposed end walls 71, 73, each of them having a hole 75 therein for receiving the heat conductive elongated element 7 therethrough. The insulating enclosure 67 also includes a tubular portion 77 hermetically fixed to the end walls 71, 73 by, for example, but not limited to, an airtight welding 91. The end walls 71, 73 are thermally sealed to the heat conductive elongated element 7 by any appropriate means such a soldering, or they can be non-conductively attached to the conductive elongated element 7 by an appropriate airtight joint. Another option to minimise losses is to provide end walls 71, 73 that are made of an insulating material. Thus, this assembly 1 constitutes an airtight construction enclosing the conductive elongated element 7. Any other appropriate means providing an air tight construction around the portion of the elongated element 7 containing the optical grating 5 could also be envisaged and the present invention intends to cover any equivalent of such a means. Air is pumped out of this enclosure and vacuum is maintained by an airtight valve 81 that can be a crimped valve for example. Advantageously, an inner shield 89 is used to increase radiation isolation and further improve the performance of the device. An outer casing 93 can also be used to provide additional protection to the assembly 1 from surrounding perturbations. In this illustrated case, heat is transferred to and taken out from the conductive elongated element 7 via heat distributors 95 in contact with circular TECs 9, 11 provided with a hole in their center mounted perpendicularly on the axis of the assembly 1. The assembly 1 further comprises a heat reservoir mounted in a thermal contact with each of the TECs 9, 11. For example, heat sinks 63, 65 may be used to dissipate heat in the ambient air. In another preferred embodiment of the invention which is not illustrated, the assembly 1 includes a heat recirculation member 17 in thermal contact with the TECs 9, 11 for recuperating and recirculating heat, thereby further improving the efficiency and performances of the present assembly 1. Of course, the embodiment presented in FIG. 7 may also benefit from advantageous features described for the embodiment of FIG. 1. For example, the assembly 1 may advantageously be provided with a servo-control system 47 connected to the TECs 9, 11 for controlling the temperatures at the ends 29, 31 of the elongated element 7.

Figure 8:
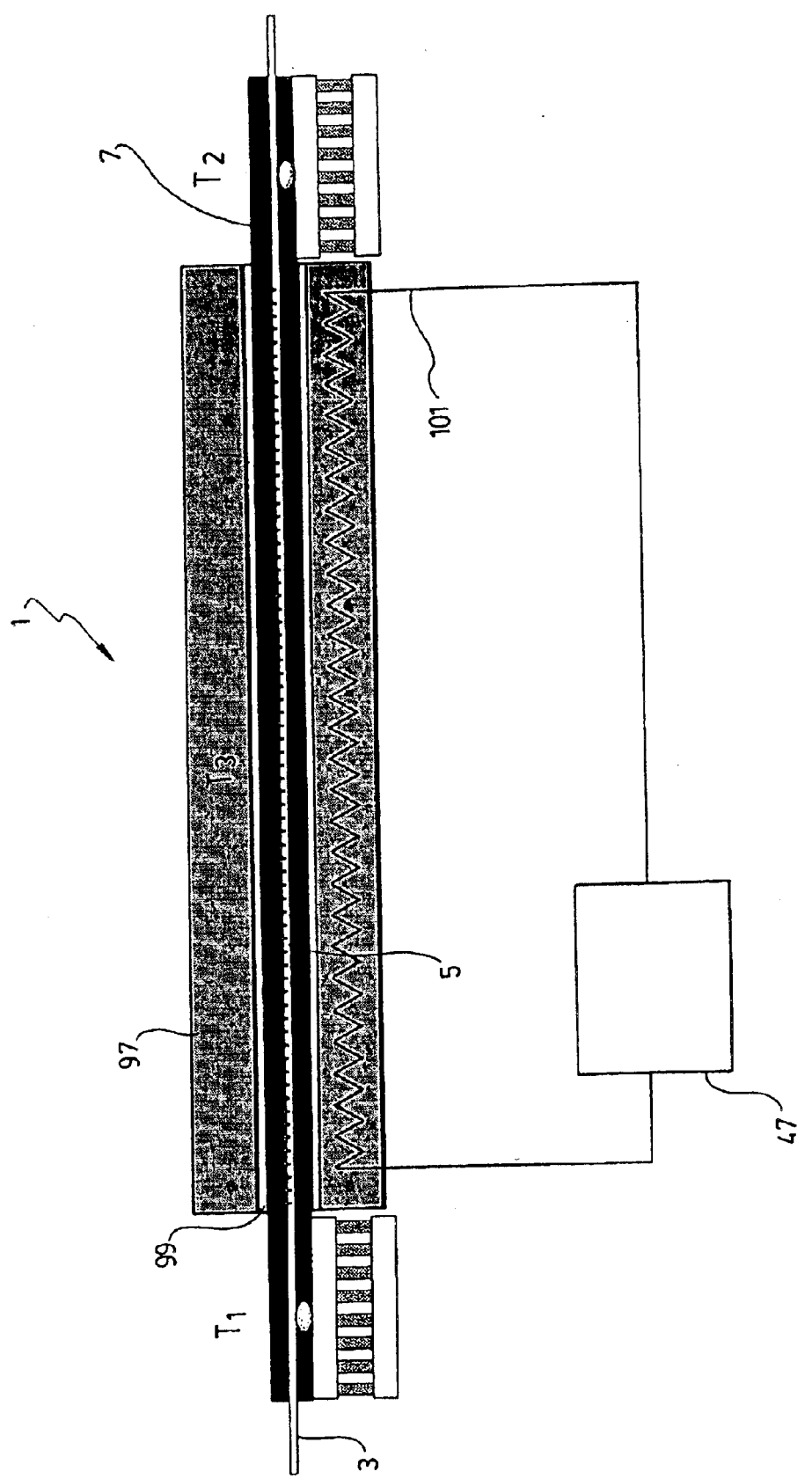
FIG. 8 is a schematic partial side view of another power efficient assembly according to another preferred embodiment of the present invention.

FIG. 8 presents another preferred embodiment of a power assembly 1 that is provided with a heating block 97 having a longitudinal cavity 99 therethrough for receiving the elongated element 7 therein. Preferably, the heating block 97 is made out of a metallic conductor, such as, for example, copper, for allowing an uniform transfer of heat therealong. More preferably, the heating block 97 is cylindrically shaped in order to be the most power efficient as the surface of this heating block is minimized. The cavity 99 is preferably slightly larger then the diameter of the elongated element 7 and is precisely aligned in order to avoid any physical contact of the elongated element 7 with the heating block 97. The assembly 1 also includes a heating means 101 for heating the heating block 97 and maintaining a temperature thereof at a fixed value. The heating means 101 may include a resistive heating wire embedded into the heating block 97. Such a heating wire can be glued or rolled onto the heating block 97. The heating means 101 may advantageously be operatively connected to the servo-control system 47 described above in order to precisely control the temperature of the heating block 97. Of course, an independent control system could also be envisaged for controlling the temperature of the heating block 97.

Thus, in this assembly, the heating block 97 fixes an exterior temperature at a fixed value $T_3$, chosen for example as the mean of the two heating TECs 9, 11 ($T_3=(T_1+T_2)/2$). This presents the major advantage of rendering the assembly 1 independent of the exterior temperature variations. With this third temperature value in the assembly, the thermal gradient in the grating 5 still will not be perfectly linear, as explained by the previous equations, but it will be more constant, which will provide a better repeatability of operation of the assembly 1 whatever the temperature fluctuations of surroundings. Advantageously, a correction in the grating curvature itself could be made to compensate for this non-linearity of the gradient.

Of course, such a heating block may be used in the other presented preferred embodiments, and more particularly in the embodiment presented in FIG. 1.

FIG. 3 illustrates the performance of the various insulation schemes presented above on the linearity of the thermal gradient. The vacuum insulation approach clearly gives the best results. Moreover, the assembly 1 allows to provide a much more power efficient device which is much more compact than existing device. In the case of insulation by an air gap, the gap thickness was taken as the maximum allowable to maintain a convectionless heat transfer. In terms of thermal insulation, this corresponded to a 10-mm layer of foam for the specific configuration studied. This radius can change in function of the length and the exterior diameter of the conductive elongated element 7 and the temperatures involved.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention. For example, a preferred application of the present invention is the active tuning of the chromatic dispersion of an optical fiber grating; but it must be understood that the present invention is intended to cover a power efficient assembly for applying a highly linear temperature gradient to any other suitable filiform element not limited to an optical fiber grating.

What is claimed is:

1. A power efficient assembly for applying a temperature gradient to a refractive index grating provided in a section of optical fiber, said assembly comprising:

a heat conductive elongated element having opposite first and second ends and a longitudinal axis extending therebetween, said elongated element having a fiber-receiving area along the longitudinal axis shaped for receiving said section of optical fiber therealong in continuous thermal contact with the elongated element;

a first heat pumping device for maintaining the first end of the elongated element at a first temperature and a second heat pumping device for maintaining the second end of the elongated element at a second temperature different from the first temperature, thereby applying said temperature gradient to the refractive index grating, each of the first and second heat pumping devices having a top side in thermal contact with a corresponding end of the elongated element and a bottom side opposed thereto, in operation, the first heat pumping device pumping heat from the top to the bottom side thereof and the second heat pumping device pumping heat from the bottom to the top side thereof; and a heat recirculation member having opposite first and second ends respectively in thermal contact with the bottom sides of the first and second heat pumping devices, in operation, the heat recirculation member recuperating heat from the bottom side of the first heat pumping device and recirculating said heat to the bottom side of the second heat pumping device.

2. The power efficient assembly according to claim 1, wherein said heat conductive elongated element is made out of a metallic conductor.

3. The power efficient assembly according to claim 1, wherein the fiber-receiving area comprises a groove provided along the heat conductive elongated element and a thermal compound extending therein for providing the continuous thermal contact between said section of optical fiber and said heat conductive elongated element.

4. The power efficient assembly according to claim 1, wherein said heat conductive elongated element is a tube provided with a cavity along said longitudinal axis defining said fiber receiving area and freely receiving said section of optical fiber.

5. The power efficient assembly according to claim 4, wherein said tube has an exterior surface provided with a mirror finish.

6. The power efficient assembly according to claim 1, further comprising pressure mounting means for mounting each of said heat pumping devices in thermal contact with said corresponding ends of the elongated element.

7. The power efficient assembly according to claim 1, wherein said first and second heat pumping devices are Peltier Effect Thermo-Electric coolers.

8. The power efficient assembly according to claim 1, wherein each of said heat pumping devices is operationally connected to a temperature sensor mounted in close proximity to said corresponding end of said heat conductive elongated element.

9. The power efficient assembly according to claim 1, further comprising a servo-control system connected to each of said heat pumping devices for precisely controlling said first and second temperatures.

10. The power efficient assembly according to claim 1, further comprising:
at least one additional heat pumping device, each having a top side arranged in thermal contact with said heat recirculation member, and a bottom side opposed thereto; and
a heat exchanging means arranged in thermal contact with the bottom side of each of said at least one additional heat pumping device for exchanging heat between said heat recirculation member and surroundings thereof.

11. The power efficient assembly according to claim 10, wherein said heat recirculation member is provided with a temperature sensor.

12. The power efficient assembly according to claim 1, further comprising:
a heating block having a longitudinal cavity therethrough for receiving the elongated element therein; and
heating means for heating said heating block and maintaining a temperature thereof at a fixed value.

13. The power efficient assembly according to claim 12, wherein said heating block is made out of a metallic conductor.

14. The power efficient assembly according to claim 12, wherein the heating means comprises a resistive heating wire embedded into said heating block.

15. The power efficient assembly according to claim 14, wherein said resistive heating wire is glued onto said heating block.

16. The power efficient assembly according to claim 14, wherein said resistive heating wire is rolled onto said heating block.

17. The power efficient assembly according to claim 12, wherein said longitudinal cavity of said heating block is shaped for receiving the elongated element therein without any contact.

18. A power efficient assembly for applying a temperature gradient to a refractive index grating provided in a section of optical fiber, said assembly comprising:
a heat conductive elongated element having opposite first and second ends and a longitudinal axis extending therebetween, said elongated element being provided with a cavity extending therethrough along said longitudinal axis for freely receiving said section of optical fiber therein in continuous thermal contact with the elongated element;
a heat exchanging system for maintaining the first end of the elongated element at a first temperature and the second end of the elongated element at a second temperature different from the first temperature, thereby applying said temperature gradient to the refractive index grating, said heat exchanging system comprising a first and a second heat pumping device respectively operationally connected to the first and second ends of the elongated element, in operation, the first heat pumping device pumping heat out of the first end of the elongated element and the second heat pumping device pumping heat in the second end of the elongated element; and,
a thermal insulating enclosure provided around at least a portion of said elongated element between said first and second ends thereof, said insulating enclosure including a vacuum chamber surrounding said portion of the elongated element.

19. The power efficient assembly according to claim 18, wherein said heat conductive elongated element is made out of a metallic conductor.

20. The power efficient assembly according to claim 18, wherein said heat conductive elongated element has an exterior surface provided with a mirror finish.

21. The power efficient assembly according to claim 18, wherein said thermal insulating enclosure comprises two opposed end walls, each having a hole therein for receiving said heat conductive elongated element therethrough, and a tubular portion thermally sealed to each of said end walls and extending therebetween, each of said end walls being thermally sealed to said heat conductive elongated element, the end walls, tubular portion and heat conductive elongated element forming a closed area defining said vacuum chamber.

22. The power efficient assembly according to claim 21, wherein each of said end walls and the tubular portion are provided with a heat reflective coating extending outwards said vacuum chamber.

23. The power efficient assembly according to claim 21, further comprising an inner shield extending inside said enclosure between the tubular portion and the heat conductive elongated element, said inner shield being connected to each of said end walls.

24. The power efficient assembly according to claim 18, further comprising an outer casing surrounding said thermal insulating enclosure.

25. The power efficient assembly according to claim 18, wherein said thermal insulating enclosure is further provided with an airtight valve for creating vacuum therein.

26. The power efficient assembly according to claim 18, wherein said thermal insulating enclosure comprises an inner and an outer tubular walls sealed together at extremities thereof for defining the vacuum chamber therebetween, said inner wall forming a longitudinal channel inwardly thereof extending centrally through said enclosure for receiving said heat conductive elongated element.

27. The power efficient assembly according to claim 26, wherein said outer wall is provided with a metallic reflective coating extending outwards said insulating enclosure.

28. The power efficient assembly according to claim 18, wherein said thermal insulating enclosure is made of glass.

29. The power efficient assembly according to claim 18, wherein said heat exchanging system comprises a heat reservoir mounted in thermal contact with each of said first and second heat pumping devices.

30. The power efficient assembly according to claim 29, wherein said heat reservoir comprises a heat recirculation member.

31. The power efficient assembly according to claim 18, further comprising:
   a heating block having a longitudinal cavity therethrough for receiving the elongated element therein; and
   heating means for heating said heating block and maintaining a temperature thereof at a fixed value.

32. The power efficient assembly according to claim 31, wherein said heating block is made out of a metallic conductor.

33. The power efficient assembly according to claim 31, wherein the heating means comprises a resistive heating wire embedded into said heating block.

34. The power efficient assembly according to claim 33, wherein said resistive heating wire is glued onto said heating block.

35. The power efficient assembly according to claim 33, wherein said resistive heating wire is rolled onto said heating block.

36. The power efficient assembly according to claim 31, wherein said longitudinal cavity of said heating block is shaped for receiving the elongated element therein without any contact.

* * * * *